United States Patent
Bent et al.

(10) Patent No.: US 10,146,642 B1
(45) Date of Patent: Dec. 4, 2018

(54) FAULT RESILIENT DISTRIBUTED COMPUTING USING VIRTUAL MACHINE CONTINUOUS DATA PROTECTION

(71) Applicant: EMC IP Holding Company LLC, Hopkinton, MA (US)

(72) Inventors: John M. Bent, Los Alamos, NM (US); Sorin Faibish, Newton, MA (US); Patrick S. Combes, Seattle, WA (US); Eriks S. Paegle, Seattle, WA (US); Joshua Emerson Simons, Sharon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 15/079,628

(22) Filed: Mar. 24, 2016

(51) Int. Cl.
*G06F 11/00* (2006.01)
*G06F 11/14* (2006.01)
(Continued)

(52) U.S. Cl.
CPC ...... *G06F 11/1471* (2013.01); *G06F 9/45533* (2013.01); *G06F 11/1407* (2013.01);
(Continued)

(58) Field of Classification Search
CPC ............ G06F 11/1471; G06F 11/1407; G06F 11/1415; G06F 11/1446; G06F 11/1448;
(Continued)

(56) References Cited

U.S. PATENT DOCUMENTS

| 6,795,966 B1* | 9/2004 | Lim ................... G06F 11/1438 |
| | | 718/1 |
| 8,539,434 B2* | 9/2013 | Vertes ................ G06F 11/3476 |
| | | 717/100 |

(Continued)

OTHER PUBLICATIONS

Paula Ta-Shma et al., "Virtual Machine Time Travel Using Continuous Data Protection and Checkpointing," ACM SIGOPS Operating Systems Review, vol. 42, Issue 1, 127-134 (Jan. 2008).

(Continued)

*Primary Examiner* — Bryce P Bonzo
*Assistant Examiner* — Anthony J Amoroso
(74) *Attorney, Agent, or Firm* — Ryan, Mason & Lewis, LLP (57) ABSTRACT

Methods and apparatus are provided for fault resilient distributed computing using a continuous data protection feature of virtual machines. An exemplary method by a compute node for executing a process of a distributed application comprises providing a virtual machine having continuous data protection to store a copy of a state of the process in a performance storage tier; and providing a virtual machine to intercept messages of the process and to store a copy of the intercepted messages in a message log, wherein the process communicates with a plurality of other processes executing on other compute nodes, and wherein the plurality of processes employ asynchronous checkpointing. The process optionally communicates with the other processes in the distributed application using one or more virtual networks. The state is optionally moved from the performance storage (Continued)

tier to a capacity storage tier when a new state is stored. The stored state and/or the message log can be purged using a stored epoch counter, or when an explicit checkpoint routine has completed.

20 Claims, 7 Drawing Sheets

(51) Int. Cl.
  *G06F 9/455* (2018.01)
  *G06F 9/50* (2006.01)
(52) U.S. Cl.
  CPC ........ *G06F 9/45541* (2013.01); *G06F 9/5072* (2013.01); *G06F 2201/805* (2013.01); *G06F 2201/815* (2013.01); *G06F 2201/82* (2013.01); *G06F 2201/84* (2013.01)
(58) Field of Classification Search
  CPC ............ G06F 11/1458; G06F 11/1464; G06F 11/1469; G06F 11/1612; G06F 9/45533; G06F 9/45541; G06F 9/5072; G06F 9/45558; G06F 9/5061; G06F 2201/805; G06F 2201/815; G06F 2201/82; G06F 2201/84
  See application file for complete search history.

(56) References Cited

U.S. PATENT DOCUMENTS

| 9,244,869 | B1 | 1/2016 | Bent et al. | |
|---|---|---|---|---|
| 2005/0027853 | A1* | 2/2005 | Martin | G06F 11/3495 709/224 |
| 2005/0182910 | A1* | 8/2005 | Stager | G06F 11/1456 711/162 |
| 2012/0072656 | A1* | 3/2012 | Archak | G06F 17/30132 711/104 |
| 2014/0059209 | A1* | 2/2014 | Alnoor | G06F 9/54 709/224 |
| 2014/0359375 | A1* | 12/2014 | Longobardi | G06F 11/1471 714/45 |
| 2015/0007172 | A1* | 1/2015 | Hudzia | G06F 9/45533 718/1 |
| 2015/0113325 | A1* | 4/2015 | Wholey, III | G06F 11/1448 714/20 |
| 2016/0366016 | A1* | 12/2016 | Cors | H04L 41/0806 |

OTHER PUBLICATIONS

Kurt B. Ferreira et al., "The Viability of Using Compression to Decrease Message Log Sizes", vol. 7640 of Lecture Notes in Computer Science, 484-493 (2012).

\* cited by examiner

FAULT RESILIENT DISTRIBUTED COMPUTING USING VIRTUAL MACHINE CONTINUOUS DATA PROTECTION

FIELD

The invention relates generally to distributed computing techniques, and, more particularly, to fault tolerance techniques for distributed computing environments.

BACKGROUND

Many large computational problems must run concurrently as a set of multiple threads or processes across a distributed set of compute nodes, such as those in a compute cluster. These types of workloads are seen in what has typically been referred to as High Performance Computing (HPC) and may use programming models such as Message Passing Interface (MPI) for coordinating their distributed computations. Distributed computing, however, is not limited to HPC or to MPI. Grid computing and cloud computing also run distributed concurrent computations. Although grid computing and cloud computing also use MPI, they also use other programming models such as distributed shared memories.

Regardless of the computing domain and the programming model, all of these distributed computations share the same challenge: how to maintain coordinated progress in spite of the continuous unpredictable failures of the underlying systems. For coordinated programs, a failure of any one component typically interrupts all of the distributed threads and processes. To mitigate this problem, a strategy referred to as checkpoint-restart is employed in which the distributed state is periodically persisted to stable storage and subsequently used to restart the processes following a failure. Distributed state capture, however, is extremely challenging primarily due to the challenges of capturing both the distributed memories as well as pending messages.

A need therefore exists for improved techniques for performing distributed state capture in parallel computing environments.

SUMMARY

Illustrative embodiments of the present invention include methods and apparatus for fault resilient distributed computing using a continuous data protection feature of virtual machines. In one exemplary embodiment, a method performed by a compute node for executing a process of a distributed application, comprises providing a virtual machine having continuous data protection to store a copy of a state of the process in a performance storage tier that employs storage resources based on performance considerations; and providing a virtual machine to intercept messages of the process and to store a copy of the intercepted messages in a message log, wherein the process communicates with a plurality of other processes executing on other compute nodes, wherein the plurality of processes employ asynchronous checkpointing. The process optionally communicates with the other processes in the distributed application using one or more virtual networks.

In one or more embodiments, the state is moved from the performance storage tier to a capacity storage tier that employs storage resources based on capacity considerations when a new state of the compute node is stored in the performance storage tier. In at least one embodiment, the stored state and/or the intercepted messages can be purged using a stored epoch counter, or when an explicit checkpoint routine has completed.

In one exemplary embodiment, following a failure, the stored state can be used to reconstruct a host image on a different compute node. In addition, the message log can optionally be used to resend messages received after the state was stored and/or to filter messages sent after the state was stored such that the same message is not sent twice.

As noted above, illustrative embodiments described herein provide significant improvements relative to conventional distributed computing systems by capturing the distributed memories and in-flight messages using virtual machines.

DETAILED DESCRIPTION

Illustrative embodiments of the present invention will be described herein with reference to an exemplary distributed computing architecture and associated compute nodes, storage systems, applications and other processing devices. It is to be appreciated, however, that the invention is not restricted to use with the particular illustrative distributed computing architecture and device configurations shown.

Exemplary embodiments of the present invention provide fault resilient distributed computing techniques using virtual machine continuous data protection. In one or more embodiments, distributed compute nodes in a distributed computing environment employ a first virtual machine having its continuous data protection feature enabled, for capturing the distributed state, and a second virtual machine for intercepting and logging in-flight messages. In this manner, the complete distributed state is captured using the continuous data protection feature of the first virtual machine on each node to capture the memory state and a message interceptor of the second virtual machine on each node to capture the messages in flight.

Distributed Resilience

There are currently two primary methods (each having a number of variations) employed for distributed state capture for checkpoint-restart. A first distributed state capture method uses computational fences, or barriers, to quiese the network (e.g., pause the network) such that the distributed state has no in-flight messages and therefore only the distributed memories need to be captured. A second distributed state capture method logs the messages such that both distributed memories as well as in-flight messages can be captured.

The computational fences method introduces a significant amount of idleness while faster processes wait at fences for their slower sibling processes as well as creating an unfavorable bursty Input/Output pattern at the storage system. One exemplary variation of the computational fences method is described in U.S. Pat. No. 9,244,869, entitled "Asynchronous Checkpointing With Message Passing to Burst Buffers," incorporated by reference herein.

The second message logging approach requires garbage collection of log messages, which can be challenging. Typically, message logs can grow unnecessarily large before being pruned. Additionally, in pathological cases, message logging is insufficient and failed distributed computations must restart from the beginning.

Another approach to provide distributed resilience attempts migration of a failing node before the failure is finalized. Unfortunately, this technique is not perfect and must therefore be augmented with checkpoint-restart.

Another approach for distributed resilience is referred to as process pairs, in which each distributed node is run twice. In this scenario, a failed node can be replicated from its mirror. The process pairs technique entails a 50% loss of efficiency, as the mirrored pairs will use twice as many resources as a non-mirrored computation. Although a processor can sometimes be safely oversubscribed without huge efficiency loss, memory cannot, and it is noted that many of these applications do indeed make full use of available memory. Additionally, this existing approach does not protect against double failures such as those that can sometimes happen randomly or as a result of side-wide problems such as power outages or rack level failures.

Fault Resilient Distributed Computation

One or more embodiments of the invention provide a hybrid resilience method comprising one or more of the following aspects:

1. Portions of the above-described process pairs technique to maintain a backup image of every node;
2. Message logging to allow uncoordinated (i.e., non-fenced) distributed state capture;
3. Asynchronous distributed transactional checkpoints allowing aggressive message log pruning and providing consistent distributed state snapshots;
4. Two tier storage using the fast tier for message logs and hot state and using the capacity tier for cold state;
5. Virtual machines to transparently capture and log the messages;
6. Continuous data protection in the virtual machines to substantially continuously provide restart images instead of at a typically very coarse checkpoint frequency;
7. Virtualized networking to allow application-transparent migration of nodes within a distributed computation;
8. Failure prediction resilience techniques (due to the much lower latency of state capture); and
9. Key-value-based flash storage, such as DSSD™ flash storage, as the performance tier of a two-tier storage system to provide additional optimizations due to the shared key-value access.

In one or more embodiments, the disclosed distributed state capture techniques work for substantially all distributed programming models because the techniques work in the virtual machine layer (rather than as middle-ware within MPI), thereby being neutral to the particular application programming model.

Figure 1:
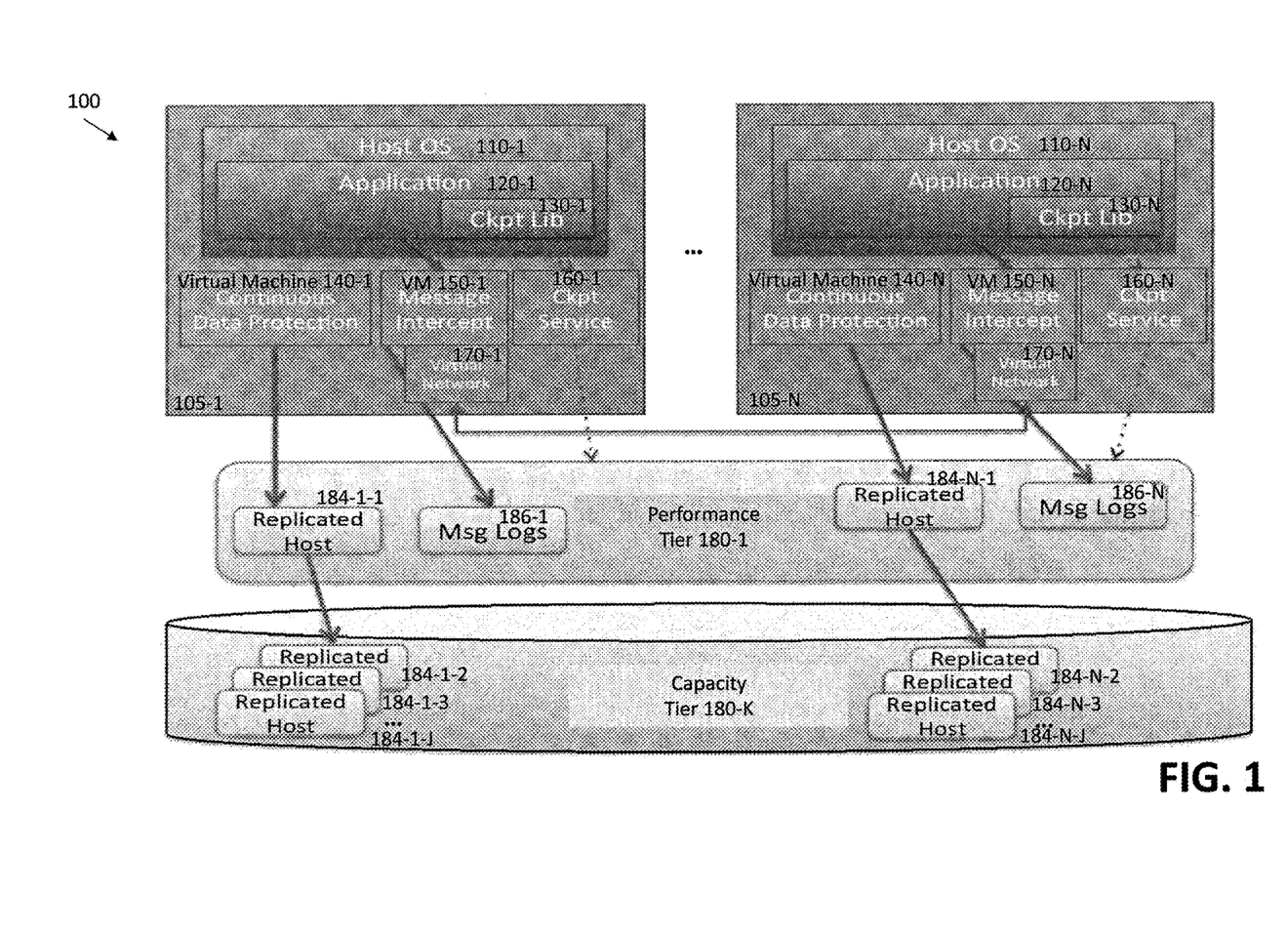
FIG. 1 is a block diagram of a distributed computing environment in which one or more aspects of the invention may be employed.

FIG. 1 is a block diagram of a distributed computing environment in which one or more aspects of the invention may be employed. As illustrated in FIG. 1, the distributed computing environment comprises a plurality of distributed compute nodes 105-1 through 105-N, discussed further below in conjunction with FIG. 2, running a corresponding plurality of operating systems 110-1 through 110-N and distributed applications 120-1 through 120-N. Each distributed application process 120-$i$ employs a corresponding checkpoint library 130-$i$ that interacts with a corresponding checkpoint service 160-$i$, discussed further below, incorporating aspects of the invention. Applications 120 can use checkpoint library 130 to provide explicit instructions to the disclosed distributed state capture and restart mechanisms. Checkpoint library 130 communicates with daemon processes (not shown) on each node 105 to provide one or more optional optimizations, discussed below.

In addition, each distributed compute node 105-$i$ provides a corresponding virtual machine 140-$i$ having its continuous data protection feature enabled, for capturing the distributed state, and a virtual machine 150-$i$ for intercepting the in-flight messages. The functionality of the virtual machines 140-$i$ and 150-$i$ are discussed further below in conjunction with FIGS. 3 and 4. In this manner, the complete distributed state is captured using the continuous data protection feature of the virtual machines 140 to capture the memory state and the message interceptor of the virtual machines 150 to capture the messages in flight. For a discussion of a continuous data protection feature of a virtual machine being used to perform checkpoints, see, for example, Paula Ta-Shma et al., "Virtual Machine Time Travel Using Continuous Data Protection and Checkpointing," ACM SIGOPS Operating Systems Review, Vol. 42, Issue 1, 127-134 (January 2008), incorporated by reference herein in its entirety.

The messages can be exchanged among compute nodes 105-1 through 105-N using a virtual network 170-1 through 170-N to allow application-transparent migration of nodes 105 within the distributed computing environment.

As illustrated in FIG. 1, the distributed computing environment further comprises a two-tier distributed storage system 180 comprising a first performance (fast) tier 180-1, that employs memory based on performance considerations (e.g., access times), and a second capacity tier 180-K, that employs storage based on capacity considerations. In this manner, the two-tier distributed storage system 180 balances between the relative costs of memory and other storage and their relative speeds. It is to be appreciated that more than two storage tiers 180-1, 180-K may be used in other embodiments. As will be described in greater detail below, the distributed storage system 180 may be accessed by compute nodes 105 running client applications 120.

The exemplary performance tier 180-1 comprises flash memory, such as a DSSD™ flash storage system, commercially available from EMC Corporation of Hopkinton, Mass., or other high-speed memory having a substantially lower access time than the capacity tier 180-K. Although flash memory will often be used, other types of low-latency memory could be used instead of flash memory. Typically, such low-latency memories comprise electronic memories, which may be implemented using non-volatile memories, volatile memories, or combinations of non-volatile and volatile memories.

As noted above, each distributed compute node 105-$i$ provides a corresponding virtual machine 140-$i$ having its continuous data protection feature enabled, for capturing the distributed state. As shown in FIG. 1, the distributed state is stored as a replicated host 184-*i-j* (where j is an index of the replicated hosts, such as a time stamp). In addition, as new versions of the replicated host 184-*i-j* are made, the prior version is optionally moved to the capacity tier 180-K.

In addition, each distributed compute node 105-*i* provides a corresponding virtual machine 150-*i* for intercepting the in-flight messages. The captured in-flight messages are optionally stored in a message log 186-*i* in the performance tier 180-1.

The exemplary capacity tier 180-K may be implemented, for example, using a Distributed Application Object Storage (DAOS) Object Store, proposed by Intel Corporation; a multi disk storage tier, such as an Isilon® storage array, commercially available from EMC Corporation of Hopkinton, Mass.; or ViPR®, a Software-Defined Storage product commercially available from EMC Corporation of Hopkinton, Mass. that abstracts storage from disparate arrays into a single pool of storage capacity.

While example embodiments of the present invention are illustrated herein using multiple storage tiers comprised of a plurality of exemplary storage technologies, such as flash storage, other storage technologies can be employed in each tier, as would be apparent to a person of ordinary skill in the art. In addition, while example embodiments of the present invention are illustrated herein using multiple storage tiers to store, for example, a checkpoint, as noted above, example embodiments of the present invention also apply to the storage of other data, such as other bursty IO tasks, as would be apparent to a person of ordinary skill in the art.

Among other benefits, the two-tier distributed storage system 180, comprising the performance tier 180-1 and second capacity tier 180-K, enables massive amounts of roll-back potential for distributed applications 120 that wish to maintain many point-in-time snapshots 184. When the application 120 calls an explicit checkpoint routine using the checkpoint library 130, the two-tier distributed storage system 180 copies the previous point-in-time snapshot 184 to the second capacity tier 180-K. In this manner, all checkpoints are available for either restarting or for analysis.

In addition, when DSSD™ storage is used as the performance tier 180-1, its shared key-value interface can be used to quickly migrate the replicated host images 184 as well as using it for the message logging and message replay. Additionally, deduplication techniques can be used across the set of replicated host images more easily since the performance tier 180-1 is a single shared resource.

Figure 2:
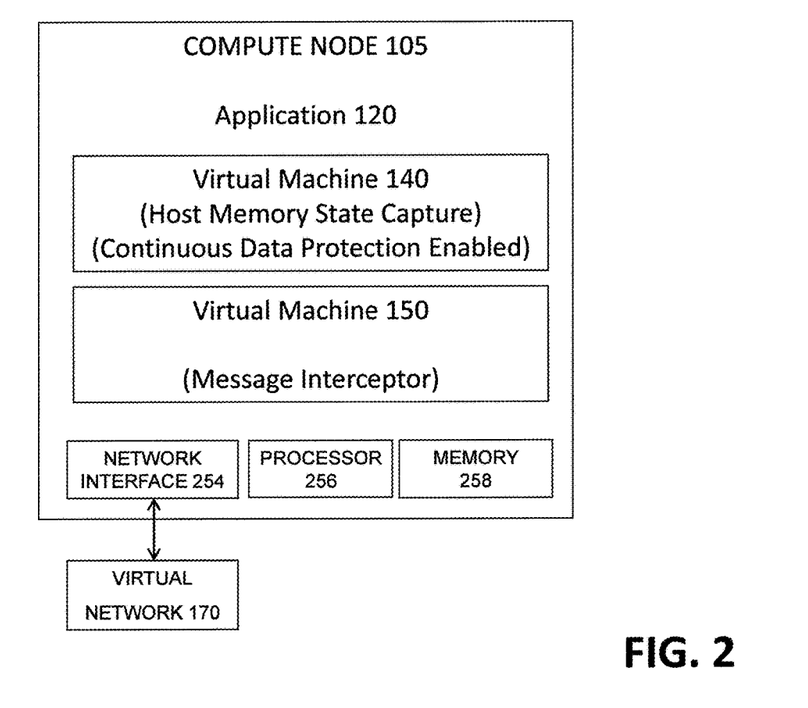
FIG. 2 is a block diagram of a compute node of FIG. 1 according to one embodiment of the invention.

FIG. 2 is a block diagram of a compute node 105 according to one embodiment of the invention. As shown in FIG. 2, the exemplary compute node 105 executes a process of the distributed application 120 and comprises a virtual machine 140 having its continuous data protection feature enabled to perform host memory state capture, and a virtual machine 150 providing a message interceptor to perform message logging.

The compute node 105 further comprises network interface circuitry 254, which is used to interface the compute node 105 with other compute nodes 105 via a virtual network 170, and other system components, and may comprise conventional transceivers. The compute node 105 further comprises a processor 256 coupled to a memory 258. The processor 256 may comprise a microprocessor, a microcontroller, an application specific integrated circuit (ASIC), a field programmable gate array (FPGA) or other type of processing circuitry, as well as portions or combinations of such circuitry elements, and the memory 258, which may be viewed as an example of a "computer program product" having executable computer program code embodied therein, may comprise random access memory (RAM), read only memory (ROM) or other types of memory, in any combination.

Figure 3:
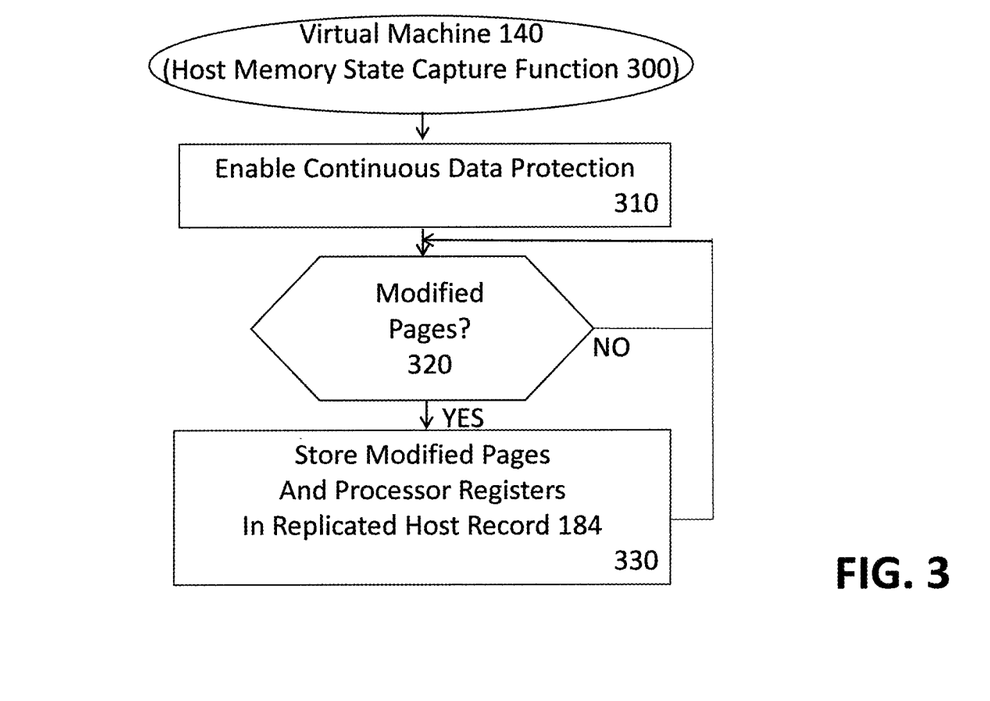
FIG. 3 is a flow chart illustrating an exemplary implementation of a host memory state capture function of a virtual machine, according to one embodiment of the invention.

FIG. 3 is a flow chart illustrating an exemplary implementation of a host memory state capture function 300 of virtual machine 140, according to one embodiment of the invention. As shown in FIG. 3, the exemplary host memory state capture function 300 initially enables the continuous data protection feature of the virtual machine 140 during step 310. Thereafter, during step 320, the host memory state capture function 300 continues to monitor for modified pages.

Once one or more modified pages are detected during step 320, the exemplary host memory state capture function 300 stores the modified pages and processor registers in a new replicated host record 184 in the performance tier 180-1 during step 330.

In this manner, the continuous data protection feature of the virtual machine 140 monitors pages dirtied in the host operating system 110. In one or more embodiments, a bit map is maintained to track modified pages and the modified pages are periodically flushed in a batch operation while substantially simultaneously capturing the necessary registers at a same or slightly longer frequency. With such a substantially continuous trickle of dirtied pages, the bursty IO pattern to the performance tier 180-1 is substantially smoothed. There is a challenge to set the protection frequency to achieve a good balance between unnecessarily resending the same page and maintaining available point-in-time snapshots. With this method, the idea of process pairs is effectively used and a mirror of each process in the system is maintained.

Figure 4:
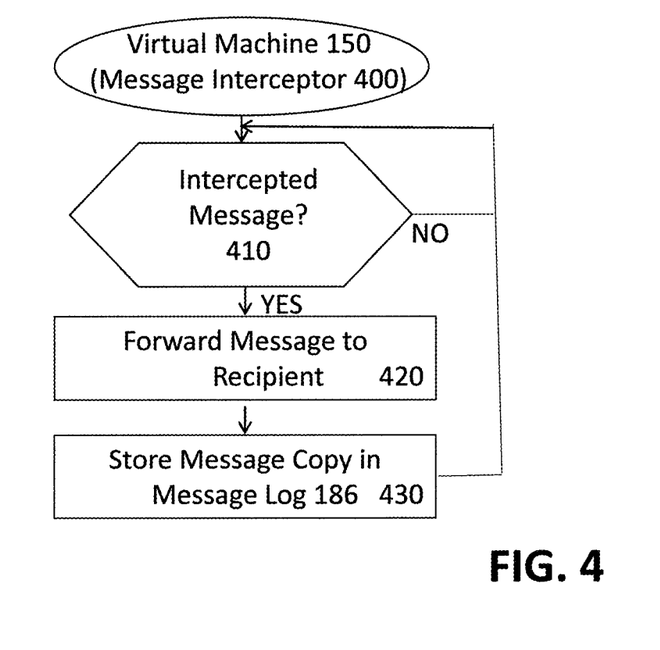
FIG. 4 is a flow chart illustrating an exemplary implementation of a message interceptor function of a virtual machine, according to one embodiment of the invention.

FIG. 4 is a flow chart illustrating an exemplary implementation of a message interceptor function 400 of virtual machine 150, according to one embodiment of the invention. As shown in FIG. 4, the exemplary message interceptor function 400 initially performs a test during step 410 to determine if a message has been intercepted. Once it is determined during step 410 that a message has been intercepted, then the message is forwarded during step 420 to the intended recipient(s). Thereafter, a copy of the message log is stored in the message log 186 in the performance tier 180-1 during step 430.

In this manner, the message interceptor function 400 replicates messages after receiving them. It forwards one copy to its intended recipient. The message interceptor function 400 also sends a copy to a message log in the performance tier 180-1. In one variation, the message log is stored on one or more of the recipient node or the sender node, thereby eliminating the extra network transmission at the cost of space on the recipient node or the sender node. The message interceptor function 400 uses a network virtualization layer to ensure that a migrated node can continue to receive messages intended for it.

Failure Recovery

Following a host failure, the stored replicated host images 184 can be reconstructed in a different physical node 105 using the last point-in-time, P, at which its registers were saved. The message logs 186 can then be used to resend messages that were received after the last point-in-time, P, and to filter messages which were sent after the last point-in-time, P, such that the intended recipients do not incorrectly receive the same message twice. For a more detailed discussion of failure recovery mechanisms for restarting nodes using the stored replicated host images 184 and message logs 186, see, for example, Kurt B. Ferreira et al., The Viability of Using Compression to Decrease Message Log Sizes, Volume 7640 of Lecture Notes in Computer Science, 484-493 (2012), incorporated by reference herein in its entirety.

Checkpoint Library

As noted above, applications 120 can use the checkpoint library 130 to provide explicit instructions to the disclosed distributed state capture and restart mechanisms. The checkpoint library 130 will communicate with daemon processes on each node to optionally provide one or more optimizations only possible with application-supplied information.

Figure 5:
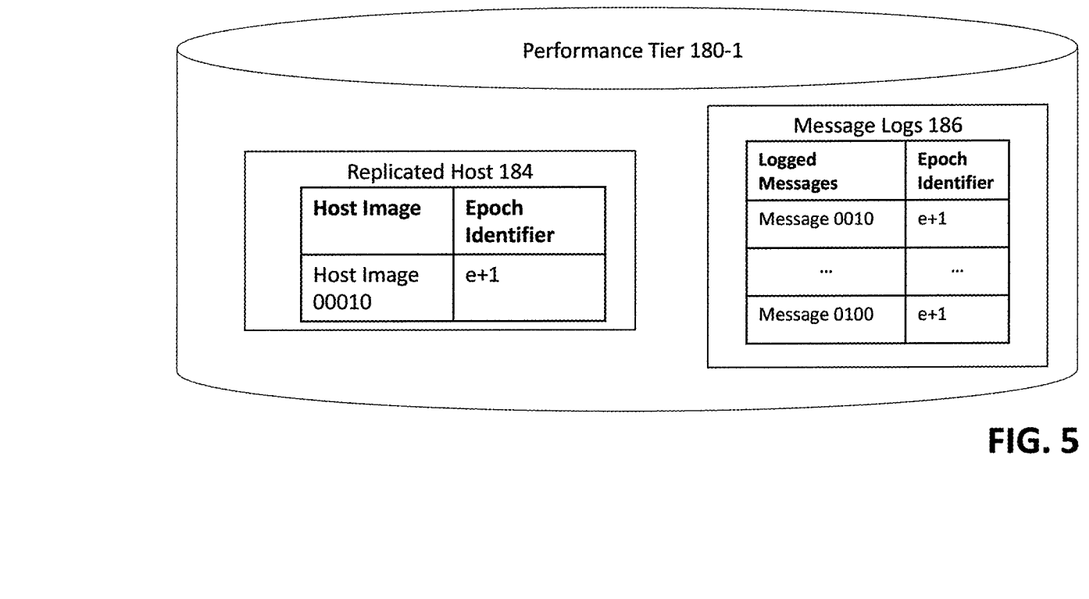
FIG. 5 illustrates exemplary records of the replicated host and message logs of FIG. 1 in further detail, according to one embodiment of the invention.

FIG. 5 illustrates exemplary records of the replicated host 184 and message logs 186 of FIG. 1 in further detail. In one or more embodiments of the invention, the application 120 optionally periodically increments an epoch counter on each host operating system 110. The epoch counters are meaningful to the distributed application 120; for example, mapping to a virtual clock or a set of simulated timesteps. With the epoch markers, an epoch identifier can be assigned by the message interceptor function 400 of FIG. 4 to each logged message in message logs 186 and by the host memory state capture function 300 of FIG. 3 to each captured replicated host image in the set of replicated hosts 184. As soon as every virtual machine monitor observes epoch e+1, and there is a replicated host image 184 available for each for epoch e, all logged messages for epochs e−1 and lower can optionally be purged. Further, the worst case restart rollback will be to the epoch e replicated host images 184.

The checkpoint library 130 also allows applications 120 to periodically call an explicit checkpoint routine. For example, an application 120 can call an explicit checkpoint routine using the asynchronous distributed transactions described in U.S. Pat. No. 9,244,869, entitled "Asynchronous Checkpointing With Message Passing to Burst Buffers," incorporated by reference herein. With this information, complete message log purging is possible. When the system receives this call from each process, the system flushes the dirty pages and registers immediately to make a replicated host image 184 and marks the replicated host image 184 with a unique identifier for this checkpoint (for example, using the epoch, or the transaction id, or a self-generated identifier depending on which are available). Once each node has finished, all message logs 186 prior to the checkpoint call can be purged.

With the disclosed checkpoint-restart techniques, failure prediction is possible in sufficient time ahead of the failure to migrate a failing node. Now, the advanced warning time, t, is smaller because of the continuous data protection. When the failure detection triggers, the small number of dirty pages are flushed to storage along with the registers. With a small enough number of dirty pages, t' becomes a tractable number smaller than t.

Sample Use Cases

In one use case, a distributed physical simulation of fuel exploration runs with MPI. With traditional checkpoint-restart, its efficiency is never better than 90% due to idleness and bursty IO. With the disclosed techniques, the simulation achieves much higher efficiency. Its IO is smoothed to reduce the storage burden and it never requires a full restart since only failed nodes need be replayed.

In another use case, a month long Department of Energy campaign realizes after three weeks that silent data corruption has rendered all results for the past two weeks to be unusable. Using the epoch identifiers, the processes resume from the last known valid state stored in the capacity tier and avoids having to restart from the beginning of the entire month campaign.

In yet another use case, a distributed memory application is performing analytics on incoming financial sensor network data streams. Its analysis results, as well as the cold data, are continuously migrated through the two storage tiers. A fan on one of the analysis nodes fails. The system pauses the running host and flushes the last few dirty pages as well as the registers into a new replicated host image. The failing node is vacated and the replicated host image is resumed on a new healthy host.

In one or more embodiments, innovative features of both virtual machines and two-tier storage techniques are merged to create failure resilience for distributed applications. Capturing the distributed state of a distributed application is challenging due to in-flight messages.

Conclusion

Among other benefits, in one or more embodiments, the present invention combines innovative features of both continuous data protection of virtual machines with two-tier storage techniques to create improved failure resilience for distributed applications.

The foregoing applications and associated embodiments should be considered as illustrative only, and numerous other embodiments can be configured using the techniques disclosed herein, in a wide variety of different cryptography applications.

It should also be understood that the checkpoint-restart techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The storage system may be implemented using one or more processing platforms. One or more of the processing modules or other components may therefore each run on a computer, storage device or other processing platform element. A given such element may be viewed as an example of what is more generally referred to herein as a "processing device."

Figure 6:
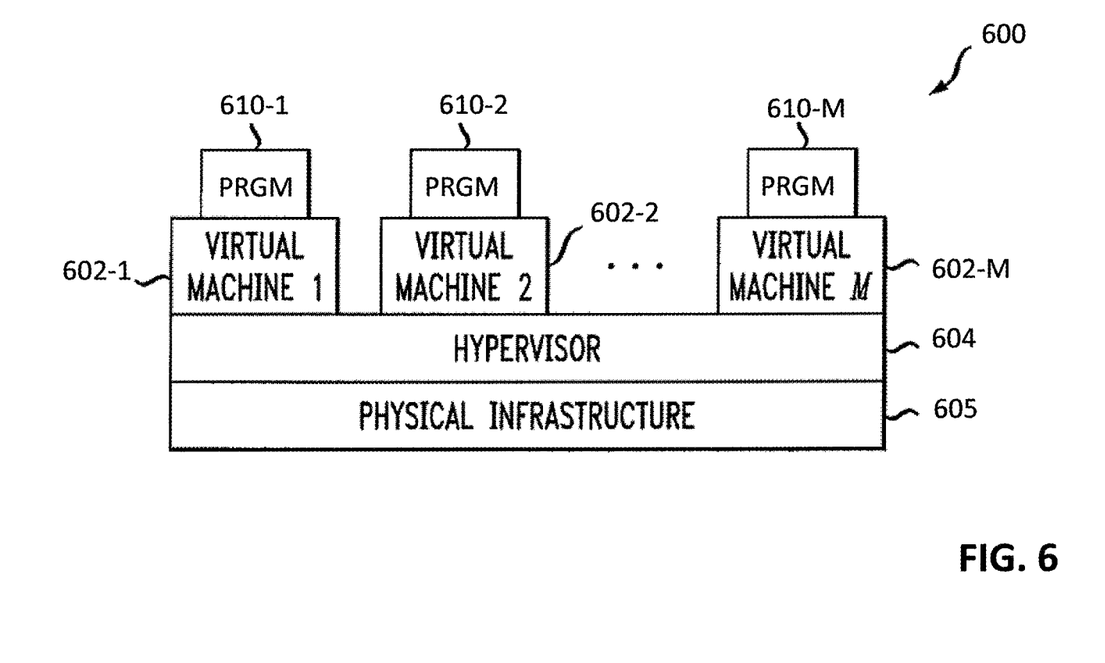
FIG. 6 illustrates an exemplary processing platform that may be used to implement at least a portion of one or more embodiments of the invention comprising a cloud infrastructure.

Referring now to FIG. 6, one possible processing platform that may be used to implement at least a portion of one or more embodiments of the invention comprises cloud infrastructure 600. The cloud infrastructure 600 in this exemplary processing platform comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

The cloud infrastructure 600 may encompass the entire given system or only portions of that given system, such as one or more of client, servers, controller, authentication server or relying server in the system.

Although only a single hypervisor 604 is shown in the embodiment of FIG. 6, the system may of course include multiple hypervisors each providing a set of virtual machines using at least one underlying physical machine.

An example of a commercially available hypervisor platform that may be used to implement hypervisor 604 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 7:
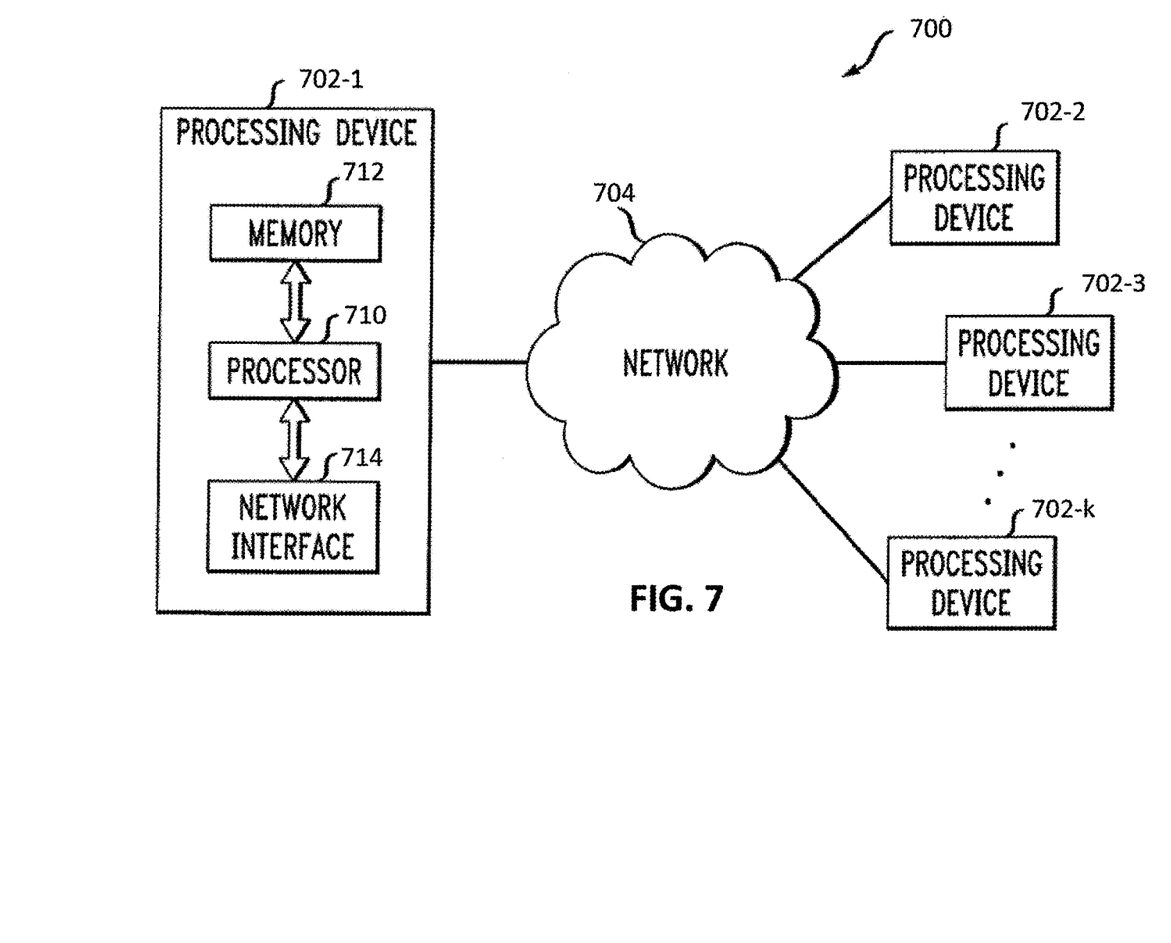
FIG. 7 illustrates another exemplary processing platform that may be used to implement at least a portion of one or more embodiments of the invention.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-k, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of storage systems that can benefit from the checkpoint-restart techniques disclosed herein. Also, the particular configuration of storage system and processing device elements shown herein, and the associated checkpoint-restart techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method implemented by a compute node executing a process of a distributed application, comprising the steps of:
    providing a first virtual machine having substantially continuous data protection to store a copy of a state of said process in a performance storage tier that employs storage resources based on performance considerations; and
    providing a second virtual machine to intercept messages of said process on said compute node and to store a copy of said intercepted messages in a message log, wherein the intercepted messages of said process (i) allow said copy of said state of said process to be obtained in an uncoordinated manner with respect to one or more additional processes of said distributed application and (ii) comprise messages that are exchanged by said process on said compute node with the one or more additional processes of said distributed application executing on one or more other compute nodes, and wherein, following a failure of said compute node, said message log is used to process one or more messages exchanged following a most recent storage of said copy of said state of said process;
    wherein said process and said one or more additional processes employ asynchronous checkpointing;
    the compute node being implemented utilizing at least one processing device coupled to a memory.

2. The method of claim 1, wherein the state comprises one or more of modified pages and processor registers of said process.

3. The method of claim 1, wherein the state is stored using asynchronous distributed transactional checkpoints with respect to other compute nodes.

4. The method of claim 1, wherein the process communicates with said other processes in said distributed application using one or more virtual networks.

5. The method of claim 1, wherein the intercepted messages of said process comprise messages that are one or more of sent and received by said process.

6. The method of claim 1, wherein the message log is stored in one or more of said performance storage tier and on one or more of said compute nodes.

7. The method of claim 1, wherein the performance storage tier comprises a key-value storage tier and wherein the method further comprises one or more of using a key-value interface to migrate a host image of said process on a different compute node and deduplicating said state stored across a plurality of said compute nodes.

8. The method of claim 1, further comprising the step of moving the state from the performance storage tier to a capacity storage tier that employs storage resources based on capacity considerations when a new state of said compute node is stored in said performance storage tier.

9. The method of claim 1, further comprising the steps of storing an epoch counter with one or more of said stored state and said intercepted messages and purging one or more of said stored state and said intercepted messages using the epoch counter.

10. The method of claim 1, further comprising the steps of executing an explicit checkpoint routine and purging one or more of said stored state and said intercepted messages when said explicit checkpoint routine has completed.

11. The method of claim 1, further comprising one or more of the steps of using said stored state to reconstruct a host image on a different compute node, using said message log to resend messages received after said state was stored and using said message log to filter messages sent after said state was stored such that the same message is not sent twice.

12. A computer program product of a compute node executing a process of a distributed application, comprising a non-transitory machine-readable storage medium having encoded therein executable code of one or more software programs, wherein the one or more software programs when executed by at least one processing device perform the following steps:
providing a first virtual machine having substantially continuous data protection to store a copy of a state of said process in a performance storage tier that employs storage resources based on performance considerations; and
providing a second virtual machine to intercept messages of said process on said compute node and to store a copy of said intercepted messages in a message log, wherein the intercepted messages of said process (i) allow said copy of said state of said process to be obtained in an uncoordinated manner with respect to one or more additional processes of said distributed application and (ii) comprise messages that are exchanged by said process on said compute node with the one or more additional processes of said distributed application executing on one or more other compute nodes, and wherein, following a failure of said compute node, said message log is used to process one or more messages exchanged following a most recent storage of said copy of said state of said process;
wherein said process and said one or more additional processes employ asynchronous checkpointing;
the compute node being implemented utilizing at least one processing device coupled to a memory.

13. The computer program product of claim 12, further comprising one or more of the steps of storing an epoch counter with one or more of said stored state and said intercepted messages; and executing an explicit checkpoint routine; and wherein one or more of (a) said stored state, and (b) said intercepted messages are one or more of: (i) purged using said epoch counter, and (ii) purged when said explicit checkpoint routine has completed.

14. A compute node system executing a process of a distributed application, comprising:
a memory; and
at least one processing device, coupled to the memory, operative to implement the following steps:
providing a first virtual machine having substantially continuous data protection to store a copy of a state of said process in a performance storage tier that employs storage resources based on performance considerations; and
providing a second virtual machine to intercept messages of said process on said compute node and to store a copy of said intercepted messages in a message log, wherein the intercepted messages of said process (i) allow said copy of said state of said process to be obtained in an uncoordinated manner with respect to one or more additional processes of said distributed application and (ii) comprise messages that are exchanged by said process on said compute node with the one or more additional processes of said distributed application executing on one or more other compute nodes, and wherein, following a failure of said compute node, said message log is used to process one or more messages exchanged following a most recent storage of said copy of said state of said process;
wherein said process and said one or more additional processes employ asynchronous checkpointing;
the compute node being implemented utilizing at least one processing device coupled to a memory.

15. The compute node system of claim 14, wherein the process communicates with said other processes in said distributed application using one or more virtual networks.

16. The compute node system of claim 14, wherein the performance storage tier comprises a key-value storage tier and wherein the steps further comprise one or more of using a key-value interface to migrate a host image of said process on a different compute node and deduplicating said state stored across a plurality of said compute nodes.

17. The compute node system of claim 14, further comprising the step of moving the state from the performance storage tier to a capacity storage tier that employs storage resources based on capacity considerations when a new state of said compute node is stored in said performance storage tier.

18. The compute node system of claim 14, further comprising the steps of storing an epoch counter with one or more of said stored state and said intercepted messages and purging one or more of said stored state and said intercepted messages using epoch counter.

19. The compute node system of claim 14, further comprising the steps of executing an explicit checkpoint routine and purging one or more of said stored state and said intercepted messages when said explicit checkpoint routine has completed.

20. The compute node system of claim 14, further comprising one or more of the steps of using said stored state to reconstruct a host image on a different compute node, using said message log to resend messages received after said state was stored and using said message log to filter messages sent after said state was stored such that the same message is not sent twice.

\* \* \* \* \*